United States Patent
Fried

(10) Patent No.: US 7,387,082 B1
(45) Date of Patent: Jun. 17, 2008

(54) PET BOWL ASSEMBLY WITH LID STORAGE CHAMBER

(76) Inventor: Adam M. Fried, 1107 Maplecrest Cir., Gladwyne, PA (US) 19035

( * ) Notice: Subject to any disclaimer, the term of this patent is extended or adjusted under 35 U.S.C. 154(b) by 181 days.

(21) Appl. No.: 11/234,738

(22) Filed: Sep. 26, 2005

(51) Int. Cl.
*A01K 7/00* (2006.01)
(52) U.S. Cl. .................................... 119/61.5
(58) Field of Classification Search ............. D30/121, D30/129–133, 199; D7/509–511, 513, 300, D7/601; 206/216, 217, 542, 546, 547, 549, 206/485, 486, 485.1, 490, 493; 220/574, 220/575, 574.2, 527, 600, 601, 604, 660, 220/661, 676, 744; 119/61.5, 61.52, 61.51, 119/72, 74, 51.5
See application file for complete search history.

(56) References Cited

U.S. PATENT DOCUMENTS

| | | | | |
|---|---|---|---|---|
| 2,659,345 A | * | 11/1953 | Herbert | 119/28.5 |
| 2,815,161 A | * | 12/1957 | Kramer | 229/404 |
| 4,691,664 A | * | 9/1987 | Crowell | 119/61.52 |
| 5,005,524 A | * | 4/1991 | Berry | 119/51.11 |
| 5,105,768 A | * | 4/1992 | Johnson | 119/61.56 |
| 5,209,184 A | | 5/1993 | Sharkan et al. | 119/61 |
| 6,830,147 B2 | * | 12/2004 | Coppola | 206/217 |
| 6,843,205 B1 | * | 1/2005 | Segreto | 119/74 |

* cited by examiner

*Primary Examiner*—Thomas Price
(74) *Attorney, Agent, or Firm*—LaMorte & Associates

(57) ABSTRACT

A feeding bowl assembly for a pet. The feeding bowl assembly has a housing, wherein an internal bowl structure is formed within the housing. The internal bowl structure has an open rim along its top. A lid is provided that is sized to cover the internal bowl structure over the open rim. A storage compartment is disposed within the housing. The storage compartment is located above the bottom of the housing and below the internal bowl structure. The storage compartment is accessible through an access opening in the housing. Both the storage compartment and the access opening are sized to receive the lid. The lid can therefore be stored within the bowl assembly when the lid is not in use. While being stored, the lid is protected from the contents of the bowl and anything that might spill out of the bowl.

10 Claims, 3 Drawing Sheets

PET BOWL ASSEMBLY WITH LID STORAGE CHAMBER

BACKGROUND OF THE INVENTION

1. Field of the Invention

In general, the present invention relates to bowls having lids. More particularly, the present invention relates to the structure of pet bowls of the type used to supply food and drink to pets.

2. Prior Art Description

The prior art is replete with different types of bowls and other containers that can be used to feed a pet dog or another animal that eats at floor level. As most any dog owner would testify, dogs do not exhibit many manners when they eat. Often when a dog eats food from a bowl placed on the floor, the dog's snout displaces food around the bowl. When a dog drinks water from a bowl, the dog's snout is submersed in the water and becomes wet. As the dog lifts its head out of the bowl, the water from the wet snout drips onto the floor. Furthermore, when a dog is either drinking or eating from a bowl, it is not uncommon for the dog to move the bowl along the floor with its snout and tip the bowl, thereby spilling the contents of the bowl onto the floor.

In the prior art, there are many different types of specialized bowls and containers that are designed to reduce the amount of spillage that occurs from a dog bowl. One common type of prior art bowl is the weighted feeding bowl. Weighted feeding bowls are bowls that have heavy bases that are wider than the tops of the bowls. Such bowls typically have sloped external walls that taper upwardly from the wide base to the smaller open top. The bowls are therefore larger at the bottom than they are at the top. By increasing the size and weight of the base of the bowl, the center of gravity for the bowl is lowered. Therefore, the bowl is very stable and it becomes harder for a dog to accidentally tip the bowl.

Many dogs do not eat all the food that is left in their bowl at one time. Rather, some dogs eat from their feeding bowls over a prolonged period of time. Consequently, food is left standing in the feeding bowl. Since pet feeding bowls are typically set on the floor and have sloped exterior walls, the food left in a pet feeding bowl is easily accessed by insects and other animals, such as mice. This is especially true if the pet feeding bowl is left outdoors for any period of time. In addition to contamination by insects and vermin, uneaten pet food can also be ruined by rain, dew, and blowing dirt. If the pet food does become contaminated in any such manner, the pet being fed will often refuse to eat the contaminated food. The contaminated food is therefore wasted and must be replaced.

In order to keep the food or water in a pet feeding bowl fresh over prolonged periods of time, it is desirable to cover the feeding bowl. By covering a feeding bowl, the contents of the feeding bowl are isolated within the bowl. The contents of the bowl, therefore, cannot be accessed by insects, vermin, rain or other contaminants. Dry food or water can therefore be kept in a covered bowl for an indefinite period of time.

In the prior art, pet feeding bowls have been invented that contain lids. For instance, in U.S. Pat. No. 5,209,184 to Sharkan, entitled Pet Travel Bowl, a feeding bowl is shown that has a lid attached to the bowl with a hinge. The problem with such prior art bowls is that the cover of the bowl is exposed to the feeding pet. The cover therefore often becomes contaminated with food and slobber, thereby harboring contamination rather than preventing contamination.

Even if the lid of a bowl were attached to the bottom of the feeding bowl, that lid would quickly become contaminated. As a pet eats and drinks, food, water and slobber splash onto the floor around the feeding bowl. Simultaneously, as the pet eats, the bowl is often moved through this contamination. Consequently, a lid stored at the bottom of the bowl is very quickly soiled.

Of course there are a great many bowls that have removable lids. The lids can be stored far away from the bowl to prevent contamination of the lid. However, with a pet feeding bowl, it is practical to have the lid at the location of the bowl. Especially, if the pet feeding bowl is kept in a garage or outside. Many people do not like to mix their pet bowls and lids with their everyday cooking ware. By storing the lid of a feeding bowl at the location of the feeding bowl, the lid is readily accessible and does not have to be retrieved from some remote location.

A need therefore exists for a pet feeding bowl that harbors a protective lid, yet prevents the protective lid from contamination when it is not in use. This need is met by the present invention as described and claimed below.

SUMMARY OF THE INVENTION

The present invention is a feeding bowl assembly for a pet. The feeding bowl assembly includes a housing having a top and a bottom. An internal bowl structure is formed within the housing. The internal bowl structure has an open rim along its top. A lid is provided that is sized to cover the internal bowl structure over the open rim.

A storage compartment is disposed within the housing. The storage compartment is located above the bottom of the housing and below the internal bowl structure. The storage compartment is accessible through an access opening in the housing. Both the storage compartment and the access opening are sized to receive and store the lid. The lid can therefore be stored within the bowl assembly when the lid is not in use. While being stored, the lid is protected from the contents of the bowl and anything that might spill out of the bowl.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention bowl can be used for any purpose, it is particularly well suited for use as a pet feeding bowl. Accordingly, the present invention will be described being used as a pet feeding bowl in order to set forth the best mode contemplated for the invention.

Figure 1:
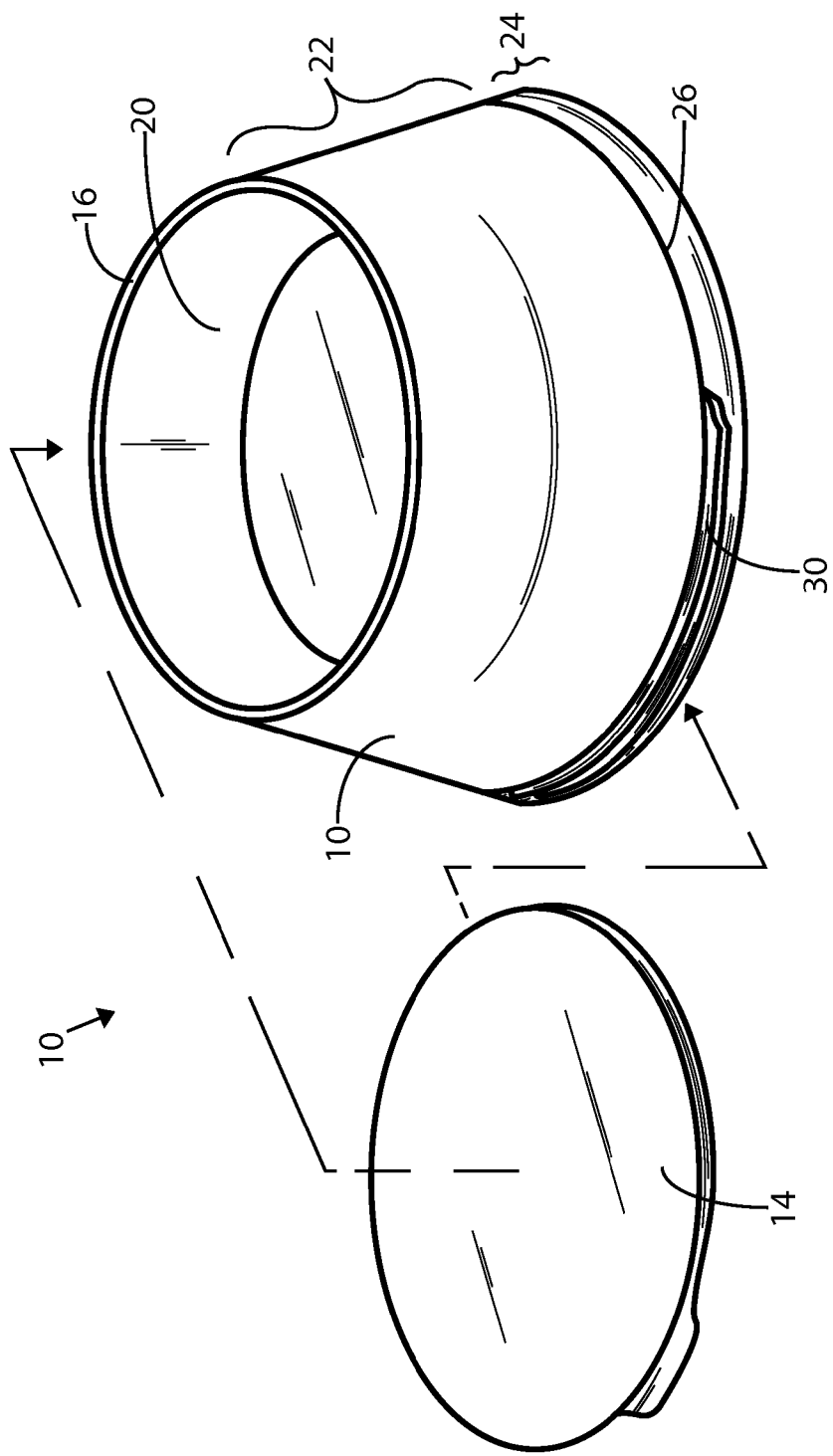
FIG. 1 is a perspective view of an exemplary embodiment of a feeding bowl assembly.

Referring to FIG. 1, there is shown an exemplary embodiment of a bowl assembly 10. The bowl assembly 10 is comprised of a bowl housing 12 and a lid 14 that can be stored within the bowl housing 12. The bowl housing 12 has a top rim 16. A concave depression is formed within the confines of the rim 16, thereby creating an internal bowl structure 20 that can hold either food or water.

The exterior of the bowl housing 12 has a tapered section 22 that extends downwardly from the rim 16. The tapered section 22 increases in diameter as a function of distance from the rim 16. Accordingly, the bottom of the tapered section 22 has the widest diameter. The bowl housing 12 also has a base section 24 that lays below the tapered section 22. The base section 24 joins to the tapered section 22 along a transition line 26. At the transition line 26, the exterior of the bowl housing 12 begins to curve inwardly toward the bottom 28 of the base section 24. The widest part of both the base section 24 and the tapered section 22 is, therefore, along the transition line 26.

A storage chamber 30 is formed into the bowl housing 12 along the transition line 26. The storage chamber 30 is sized and shaped to receive the lid 14. The lid 14 is a flexible lid that engages the top rim 16 of the bowl housing 12 with a snap fit. Accordingly, when the lid 14 is not being used to cover the internal bowl structure 20, the lid 14 can be stored within the storage chamber 30. The lid 14 is therefore positioned inside the bowl housing 12, where it is safe from external contamination.

Figure 2:
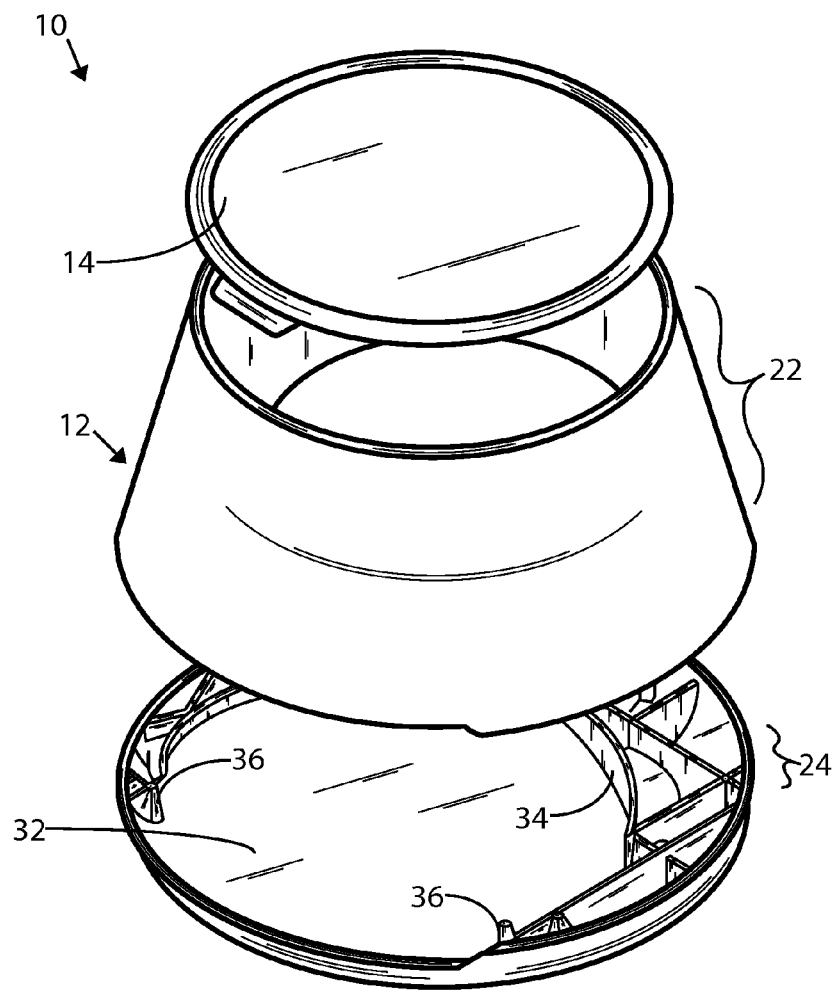
FIG. 2 is an exploded view of the embodiment of FIG. 1.

Referring to FIG. 2, it can be seen that the base section 24 of the bowl assembly 10 is preferably manufactured as a separate component from the tapered section 22. The base section 24 and the tapered section 22 are assembled to create the bowl housing 12. The base section 24 of the bowl housing 12 is preferably molded of a heavy, dense plastic. Weighted material, such as sand, cement or metal can also be placed in the base section 24 if added weight is desired.

The base section 24 creates an internal platform 32 within the bowl housing 12. The internal platform 32 is shaped to support the lid 14. A curved barrier 34 is provided that prevents the lid 14 from being over inserted into the storage chamber 30. Posts 36 are also provided that touch the sides of the lid 14, thereby creating a slight interference fit that retains the lid 14 within the storage chamber 30. This prevents the lid 14 from inadvertently falling out of the storage chamber 30, should the bowl assembly 10 be kicked, tilted or otherwise moved.

The base section 24 of the bowl housing 12 attaches to the tapered section 22 using mechanical fasteners, adhesive bonding or heat bonding. Once assembled, the base section 24 and the tapered section 22 combine to define the storage chamber 30 for the lid 14.

Figure 3:
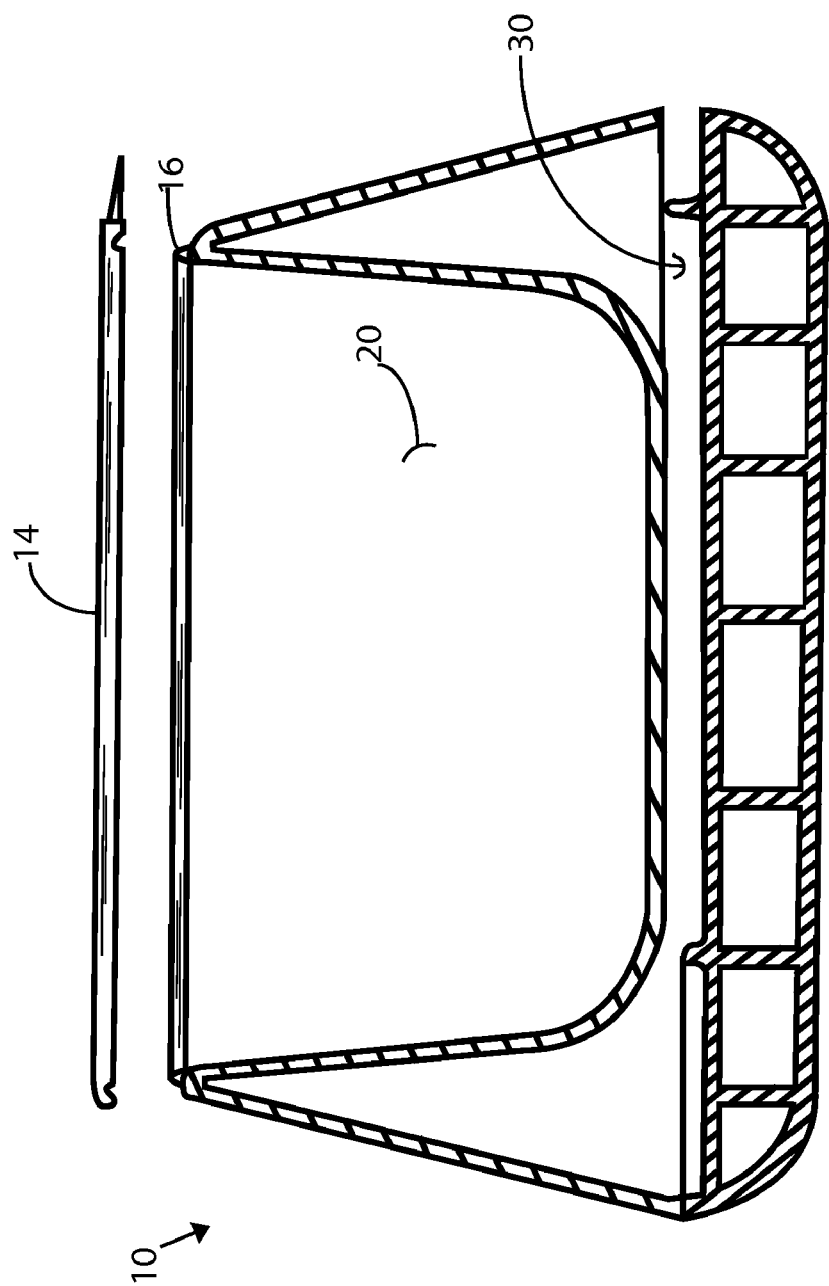
FIG. 3 is a cross-sectional view of the embodiment of FIG. 1.

Referring lastly to FIG. 3, it can be seen that the storage chamber 30 is isolated from the internal bowl structure 20. Consequently, when food or water is placed within the internal bowl structure 20, that material cannot seep into the storage chamber 30 and contaminate the lid 14. Thus, when the lid 14 is placed within the storage chamber 30, the lid 14 is protected. The lid 14 therefore can be kept with the bowl assembly 10 without being contaminated as a pet eats or drinks from the bowl assembly 10. However, the lid 14 can be removed at any time from the storage chamber 30 and placed on the rim 16 of the bowl housing 12. The lid 14 engages the rim 16 with a snap fit, thereby isolating the internal bowl structure 20.

It will be understood that the embodiment of the present invention being illustrated and described is merely exemplary and that a person skilled in the art can make many changes using functionally equivalent components. For example, in the exemplary embodiment, the shape of the bowl housing, the bowl rim, the storage chamber and the lid are all circular. These elements can be made to be square or any other shape as a matter of design choice. Similarly, the lid can be made to engage the rim of the bowl housing in a number of ways other than the snap-fit described. All such variations, modifications and alternate embodiments are intended to be included within the scope of the present invention as set forth by the claims.

What is claimed is:

1. A feeding bowl assembly for a pet, comprising:
   a housing having a top and a bottom;
   an internal bowl structure formed within said housing, wherein said internal bowl structure defines an open rim along said top of said housing;
   a lid sized to cover said internal bowl structure, wherein said lid fits over said open rim and engages said open rim with a snap-fit connection; and
   a storage compartment disposed within said housing above said bottom of said housing and below said internal bowl structure, wherein said storage compartment is accessible through an opening in said housing and is sized to receive and store said lid therein.

2. The assembly according to claim 1, wherein said housing has a base section extending upwardly from said bottom and a tapered section extending from said base section to said top.

3. The assembly according to claim 2, wherein said storage chamber is disposed between said base section and said tapered section.

4. The assembly according to claim 2, wherein said base section is weighted.

5. The assembly according to claim 2, wherein said base section joins to said tapered section along a transition line.

6. The assembly according to claim 5, wherein said transition line is the widest part of said housing.

7. The assembly according to claim 1, wherein said lid is engaged within said storage chamber with an interference fit, thereby preventing said lid from inadvertently falling out of said storage chamber.

8. A method of storing a lid for a bowl, comprising the steps of:
   providing a bowl housing having a top rim, a bottom and an internal bowl structure that opens to said top rim, wherein a storage chamber is defined within said bowl housing above said bottom and below said internal bowl structure;
   providing a lid configured to selectively cover and engage said top rim of said internal bowl structure with a snap-fit; and
   storing said lid within said storage chamber until said lid is utilized to cover said internal bowl structure.

9. A bowl assembly, comprising:
   a housing having a top surface and a bottom surface, wherein a rim is disposed on said top surface;
   a bowl depression descending from said rim into said housing toward said bottom surface;
   a lid sized to cover said bowl depression, wherein said lid engages said rim with a snap-fit connection; and
   a storage chamber disposed in said housing in between said bottom surface and said bowl depression, wherein said storage chamber is sized to receive said lid therein.

10. The assembly according to claim 9, wherein said lid is engaged within said storage chamber, therein preventing said lid from inadvertently exiting said storage chamber once placed therein.

* * * * *